FREQUENCY CODED DIGITAL RECORDING SYSTEM

Filed Sept. 16, 1963 2 Sheets-Sheet 1

INVENTOR.
RAYMOND B. LARSEN
BY John E. Reilly
ATTORNEY

Nov. 21, 1967 R. B. LARSEN 3,354,463

FREQUENCY CODED DIGITAL RECORDING SYSTEM

Filed Sept. 16, 1963 2 Sheets-Sheet 2

INVENTOR.
RAYMOND B. LARSEN
BY John E. Reilly
ATTORNEY 3,354,463
FREQUENCY CODED DIGITAL RECORDING SYSTEM Raymond B. Larsen, Broomfield, Colo., assignor to The Electric Information Company, Broomfield, Colo., a corporation of Wyoming Filed Sept. 16, 1963, Ser. No. 309,098
9 Claims. (Cl. 346—74)

ABSTRACT OF THE DISCLOSURE

In the data recording system, each unit of information or digit is represented by a different combination of frequencies which are simultaneously recorded in parallel channels on a magnetic tape recording system, and each series of frequency combinations can be immediately error-checked in a counting circuit which counts the number of frequencies recorded on each channel and provides a visual indication of the number of frequencies recorded does not correspond with the number of information units to be recorded on the tape recording surface.

Figure 1:
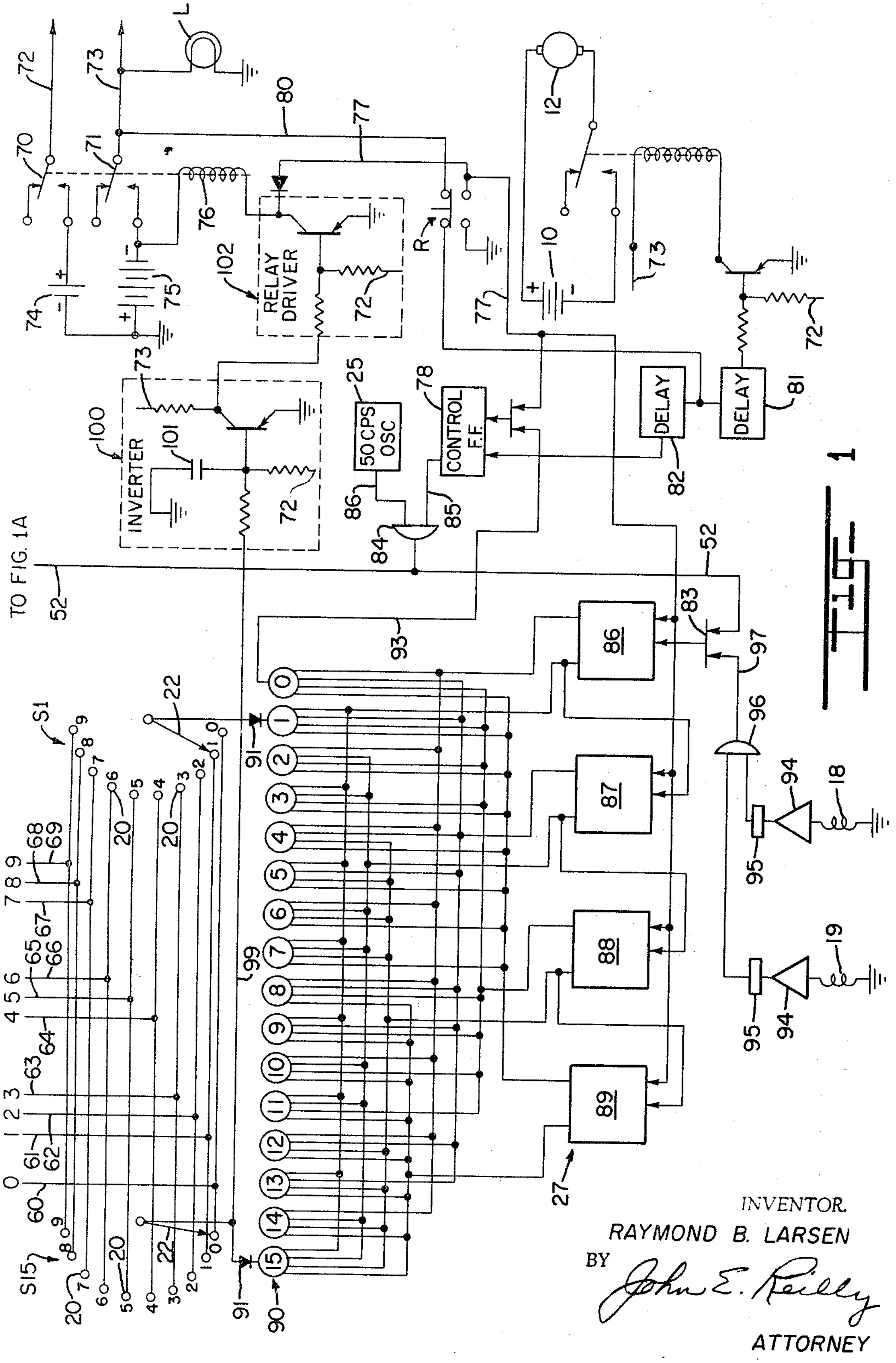

This invention relates to new and useful recording and storage systems and more particularly to a portable recording unit and system logic therefor to code and to translate numerical data into frequency combinations for recording on a magnetic storage medium.

In the computer field, various techniques and logical systems have been devised to translate information into machine language for the purpose of recording and subsequent read-out into data processing units. Magnetic data recording and storage devices, such as, for instance, magnetic tapes or magnetic drums, are conventionally employed in storing information, tapes having particular utility since they can be used in portable units then removed for transfer and translation of the information recorded into a central data processing system. In the past, one disadvantage in data recording systems utilizing magnetic tapes and the like has been the time and space required to write the information then later to read the information into the central system; therefore it is desirable to select a system logic and circuitry arrangement which will speed up access time, will record the information in the least space possible, and will facilitate handling and use of the system with a minimum of skill required on the part of the operator. In particular, portable or "hand" units would have a number of useful applications with the above enumerated advantages, for example, inventory control or collection of statistical data; and in such units it is especially important that the data be recorded in proper sequence with minimum time and power requirements so as to permit efficient battery operation.

Accordingly, it is a principal object of the present invention to provide for a novel and improved data recording system; moreover, to provide for a recording device and system logic having particular adaptation for use in portable or "hand" recording units utilizing magnetic storage media.

It is another object of the present invention to provide for a data storage system wherein the system logic devised will provide for coding of a wide diversity and amount of information in a minimum of space and in proper sequence while reducing the access time required for recording and read-out of the information stored.

It is a further object of the present invention to make provision in a data storage unit for improved coding and recording of information, whether in numerical, alphabetical or word form, and in such a way as to secure a wider variation and selectivity in character and amount of information recorded; and more specifically will afford a greater number of code combinations representative of the information for direct conversion and storage in the least space possible.

It is a still further object of the present invention to provide a data recording system which is characterized by quick, accurate recording and storage of information and having rapid access time with minimum control circuitry required so as to be very compact and simplified in operation; and furthermore which eliminates introduction of errors due to mechanical or electrical malfunctioning into the central computer system while presenting a direct visual indication of such errors to the operator.

It is an additional object to provide for instantaneous recording and storage of information on a movable recording surface through means for simultaneously and sequentially producing discrete frequency burst combinations, each combination being representative of a characteristic unit of information for continuous and sequential storage in parallel on the recording surface; moreover, to enable immediate playback of the information for error checking by sensing the number of pulse combinations recorded through the same control circuitry utilized in recording and storage, and as a result of which errors can be immediately detected in each set of information before recording the next run.

In accordance with the presence invention, there has been devised a unique data recording system whereby information is directly translated into frequencies or frequency combinations for storage on parallel tracks of a movable recording surface. The frequencies and combinations thereof form part of a combinatorial code wherein each is representative or characteristic of a number or particular unit of information. The characteristic frequencies are generated and selected for recording in bursts and in different combinations on parallel tracks of a recording surface according to the code format thereby to permit greater amounts of information to be stored in less space and time on the recording surface as well as to permit more rapid, dependable error-checking. The system logic devised further reduces access time required for translation of the information into conventional data processing units with accurate discrimination between frequencies for most accurate read-out of information. Another feature in this regard is the close correlation and synchronization between information applied and that stored by utilizing common control signals for sequencing the information to be stored and for regulating the time interval for recording each burst combination.

Figure 1A:
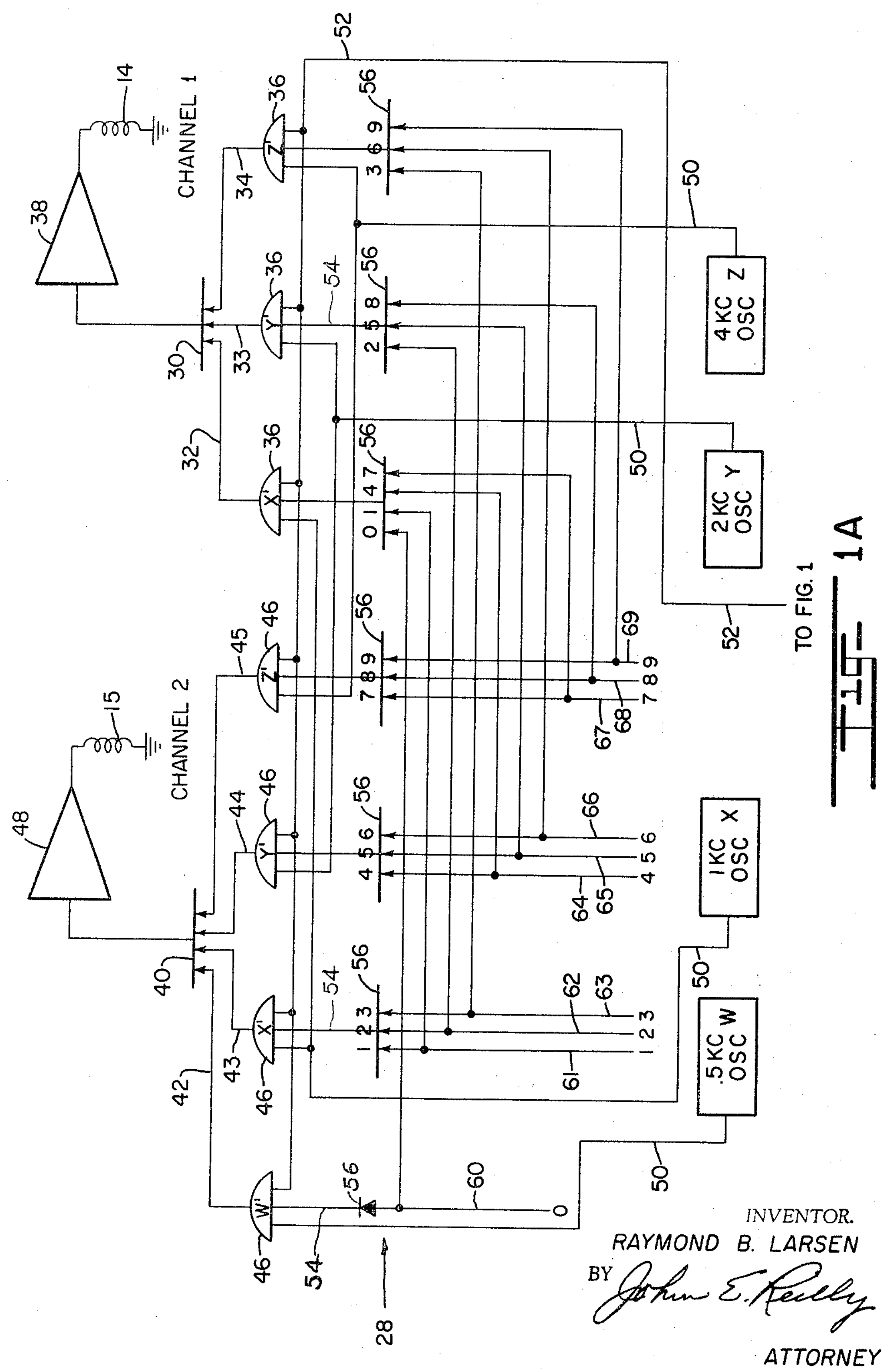

The above and other objects, advantages and features of the present invention will become more readily understood and appreciated from a consideration of the following detailed description taken together with the accompanying drawing, in which FIGURES 1 and 1A are together a schematic diagram of one form of data recording and storage system in accordance with the present invention and characterized by employing two recording tracks or channels for storing information on magnetic tape.

Referring in general to the system logic and circuitry arrangement employed to carry out the principles of the present invention, the preferred embodiment is illustrated as being in the form of a portable or "hand" numerical data recording unit having a battery power source 10 for a tape drive motor 12 adapted to advance a conventional magnetic tape recording surface, not shown. Recording heads 14 and 15 are positioned in side-by-side relation for recording on parallel tracks designated as channels 1 and 2 on the recording surface, and read heads 18 and 19 are spaced in trailing relation to the recording heads for reading back the information stored on the channels for the purpose of error-checking. In the form illustrated, numerical information is to be coded in sequence for storage on the recording tape according to numerical settings on each of a series of fifteen manual switches S, the first switch $S_1$ and the last switch $S_{15}$ being represented. Although not shown, each switch has a dial numbered from 0 to 9 inclusive, with correspondingly numbered switch contacts 20 and a wiper arm 22 which, as represented at switch $S_1$, is automatically advanced to a contact 20 corresponding to the manual setting on the switch dial. A typical switch of this type is the Rotary Ten-Position Thumb Switch manufactured by Chicago Dynamics, Inc. and identified as Model No. MTD–27272. Essentially, each dial may be manually advanced or turned to the desired number setting, and for example the dials may be used either individually or in combinations to represent one or more digits of a number. When the manual switches S have been advanced to the desired number settings, these number settings are sequentially scanned and directly translated according to a combinatorial code, to be described, for recording and storage on the tape; and the information so recorded is immediately checked for errors before recording the next run. The foregoing sequence is set in motion by depressing and releasing a "record" button R: In a manner to be described in more detail, the tape drive motor is energized to advance the tape and a clock pulse source 25 is activated for the purpose of sequentially scanning, through a counting circuit 27, the numerical settings or contacts 20 on the switches S. Each number setting is then translated by write circuit 28 into a frequency combination representative of the number for recording through the recording heads 14 and 15 onto the recording tape surface. In the preferred form, briefly each numeral from 0 through 9 is represented by a combination or pairs of different characteristic frequencies that are simultaneously recorded in parallel on the channels 1 and 2 of the tape. Once recorded, the frequency combinations are read back through the playback heads 18 and 19 into the counting circuit 27 in a manner such that exactly fifteen bursts must be present on each of the channels in order to clear the circuit for the next recording phase; otherwise an error indicator lamp L will remain lighted to indicate the presence of an error either due to faulty recording or malfunctioning of the tape itself.

Considering in more detail the combinatorial code devised, each number or unit of information is assigned a combination of two characteristic frequencies, again each combination to be simultaneously stored as parallel readings through the recording heads 14 and 15 on the channels. For example, for ten possible number settings 0 through 9 four different frequencies may be present for selection and pairing in ten different combinations, it being understood at the outset that any desired number of frequency combinations and channels may be provided to represent or correspond to different numbers or variations in information to be stored. It will be seen in this connection that binary conversion or other intermediate forms of conversion are eliminated since the numbers are converted directly into characteristic frequencies to be recorded on tape. In the specific embodiment illustrated, the four characteristic frequencies are supplied by oscillators in the write circuit identified as W, X, Y, and Z which may respectively generate frequency pulses at 500, 1000, 2000, and 4000 cycles per second. In the present embodiment, the correlation between frequencies and numerical settings is given for the purpose of illustrative example in the following table:

| Number Represented | Channels 1 | Channels 2 |
|---|---|---|
| 0 | W | X |
| 1 | X | X |
| 2 | X | Y |
| 3 | X | Z |
| 4 | Y | X |
| 5 | Y | Y |
| 6 | Y | Z |
| 7 | Z | X |
| 8 | Z | Y |
| 9 | Z | Z |

By pairing or combining characteristic frequencies it is therefore possible to reduce the number of frequency pulse generators and recording channels, and generally to reduce the recording space, equipment and power required in storing such information; also it will become apparent that more accurate error-checking results since each number is indicated by the presence of two characteristic frequencies.

In the write circuit 28, there is illustrated one specific form of circuit arrangement for reading the information coded into the manual switches S and translating that information into frequency combinations, according to the combinatorial code set forth in the foregoing table, for recording on channels 1 and 2. To initiate recording through channel 1, an OR gate 30 is enabled by the arrival of characteristic frequency pulses through one of the leads 32, 33 or 34 each connected to an AND gate 36; from the OR gate 30, the frequency pulses are applied through amplifier circuit 38 to the recording head 14. Similarly, for recording on channel 2, an OR gate 40 is enabled by pulses applied through one of the leads 42, 43, 44, or 45, each connected to an AND gate 46 for passage of the frequency pulses into amplifier circuit 48 for the recording head 15. Input leads 50 are provided for each of the gates 36 and 46 from one of the oscillator circuits W, X, Y or Z so that different characteristic frequency pulses are applied to each of the three gates 36 in channel 1 and each of the four gates 46 for channel 2, and in this relation the gates 36 and 46 are identified as W', X', Y' or Z' to correspond with the characteristic frequency applied thereto. Thus, depending upon which one of the three AND gates 36 is enabled in a manner to be described, a continuous train of pulses at the selected frequency is applied through OR gate 40 for amplification and recording in channel 2 simultaneously and in parallel with the frequency pulses recorded on channel 1. To synchronize and to control the duration of recording of each frequency through channels 1 and 2, the clock pulse source 25 in a manner to be described applies a train of control or timing pulses over common lead 52 to an input of each of the gates 36 and 46; and to select one of the gates 36 and one of the gates 46 for simultaneous recording of the desired frequencies an enabling or information signal is applied over one of the leads 54 from OR gates 56. It will be noted that the OR gates 56 for each channel are also identified by their connection to one or more of the number contacts, 0 through 9 of the manual switches S and which gates 56 and switches are interconnected by leads 60–69, respectively. For example, each number contact 1 for the fifteen switches has a lead 61, which leads are connected in parallel to one another for interconnection with the 0–1–4–7 OR gate 56 in channel 1 and the 1–2–3 OR gate 56 in channel 2. Briefly, when the switches are scanned by the control counting circuit, if the wiper arm 22 for switch $S_1$ has been advanced to contact 1, an enabling pulse is applied through the lead 61 to correspondingly identified OR gates 56 for the purpose of enabling AND gates X' in channels 1 and 2, according to the code as set forth in the table. As described, a one kilocycle frequency delivered by the oscillator X to each of the gates X' will be simultaneously recorded on channels 1 and 2 to indicate the number 1. In sequence and for the purpose of illustration, if the switch $S_2$ has its wiper arm at number contact 5 an enabling signal from the counting circuit 27 is applied through the lead 65 to the 2–5–8 gate 56 in channel 1 and the 4–5–6 gate 56 for channel 2, thereby enabling gates Y' in channels 1 and 2 for simultaneously recording two kilocycle frequencies from the oscillator Y on each of the channels. In rapid succession, each manual switch setting is scanned and an enabling signal delivered to a selected gate 56 for each channel and which in turn will enable the associated oscillator gates 36 and 46 of each channel so as to gate selected frequencies for simultaneous recording.

To control the duration of recording and spacing between frequency bursts recorded on the tape surface, each of the AND gates 36 and 46 is selectively enabled by the arrival of an enabling signal from one of the OR gates 56 and timing pulses from the clock pulse source 25. As described, the enabling signal from the counting circuit will determine which combination of frequencies are to be cleared through the gates 36 and 46, and the timing pulses will regulate the time period of recording the frequency pulses. To synchronize the arrival of the timing and enabling signals, the pulses generated by the clock pulse are used both as timing pulses over lead 52 to each of the gates 36 and 46 and as counting pulses to advance the counting circuit 27. In this way, the counter is advanced to deliver an enabling signal through the closed contact of each of the manual switches 5 in succession in synchronization with the arrival of a timing pulse at each of the gates 36 and 46. Specifically, when record button R is manually depressed, switches 70 and 71 are closed in the main power lines 72 and 73 from positive and negative battery sources 74 and 75 to energize a latching relay coil 76. In the depressed position, it will be noted that a ground signal is applied through head 77 to clear flip-flop stage 78 and the counting circuit 27 for the recording cycle. When the button R is released contact 71, remaining closed, will supply a negative potential through lead 80 to a delay circuit 81 connected to the drive motor 12. The delay 81 serves merely to isolate operation of the drive motor from the rest of the system so that the drive motor will continue to run for a predetermined time interval apart from the rest of the circuit. In a manner to be seen, this will insure that the motor will stop at the end of the selected time interval whether or not an error is found and so as to not use up excess tape in the event there is an error in recording; here, the time interval selected will be more than sufficient for normal recording and error-checking. In addition, the lead 80 is connected through a delay circuit 82 to the flip-flop stage 78.

In recording, to initiate delivery of pulses for counting and timing, a clock pulse control gate 84 has a first input 85 from the output of the flip-flop stage 78 and a second input 86 from the clock pulse source 25. When the flip-flop stage 78 is initially cleared by depression of the record button, the gate 84 is disabled; and for a predetermined time interval after the record button R is released, as controlled by the delay circuit 82, the gate remains disabled for a limited time interval sufficient to permit the motor to reach full speed. After a predetermined delay, a negative potential is applied through the delay circuit 82 to set the flip-flop stage 78 and to enable the gate 84 through input lead 85 for passage of pulses from the pulse source 25. Here, the pulse source may be defined by a free-running multivibrator which will apply a continuous stream of pulses to the gate 84 independently of the flip-flop stage 78, the latter merely controlling the opening and closing of the gate 84. Each of the clock pulses applied through lead 52 will of course have a positive-going phase and a negative-going phase, the positive-going phase being effective to enable any one or more of the gates 36 and 46, and the negative-going phase being effective to enable the OR gate 83 into the counting circuit 27.

As illustrated, the counting circuit 27 is defined by a conventional four stage binary counting circuit utilizing flip-flop stages 86, 87, 88 and 89 and which are connected through a diode matrix 90, which has a series of diodes numbered from 0 to 15 to successively scan or count from 0 through 15. Since the counter is initially cleared or set to 0, the first counting pulse from the clock pulse source 25 through OR gate 83 will advance the counter to a count of 1 to apply an enabling signal from the battery source 75 through the flip-flop stage 86 and the diode 1 matrix 90 then through the closed contact or number setting on the manual switch $S_1$. Thus, according to the number setting on each switch S, the negative enabling signal from the counting circuit is applied in succession through the closed contact of each switch to a correspondingly numbered control gate 56. In addition, isolation diodes 91 are employed in the matrix 90 to isolate the switch contacts 22 from the flip-flop stages in the counting circuit to prevent feedback of the information or enabling signals. The time interval between counts, and consequently for applying a signal through each of the manual switches, is controlled by the frequency of the clock pulse source. For instance, assuming that the clock pulse source 25 is generating pulses at 50 cycles per second, each pulse would be of 20 milliseconds duration so that the negative-going phase and positive-going phase are each of 10 milliseconds duration. However, the counting circuit would be advanced each count in response to the leading edge of each negative-going phase so that the spacing between counts would be of 20 milliseconds duration and each enabling signal from the counting circuit would be applied simultaneously to one of the gates 36 and one of the gates 46 for a 20 millisecond time interval. However, since the positive-going phase of each timing pulse is only of 10 millisecond duration, each selected frequency burst would be recorded for a maximum of 10 milliseconds so as to establish a spacing of approximately 10 milliseconds duration between bursts on the recording surface. As a result, each channel will have recorded thereon two discrete frequency bursts representative of a single unit of information, the frequency of each burst being determined by the number setting through which each enabling signal is delivered from the counting circuit, and the duration of which will be determined by the repetition frequency of the pulses applied by the clock pulse source 25.

Turning now to the error-checking stage of the circuit, when the counting circuit has counted to 15 the next counting pulse will set the circuit to 0 to apply a negative signal from the flip-flop stage 86 through lead 93 to reset the flip-flop stage 78, as a result of which the control gate 84 is disabled to stop the write cycle. The relay 76, however, remains energized as does the tape drive motor 12. Accordingly, the playback heads 18 and 19 being positioned in trailing relation to the recording heads 14 and 15 will read back the pulse bursts recorded on the channels for the fifteen number settings to apply corresponding signals through the two read amplifiers 94 and shaper circuits 95 to the AND gate 96. Assuming that a series of fifteen frequency bursts has been properly recorded in side-by-side relation on the recording channels, each pair of frequency bursts are read back simultaneously to enable the AND gate 96 and apply a counting pulse through lead 97 to again enable the OR gate 83. Accordingly, for the fifteen number settings, assuming that the frequency bursts have been properly recorded, fifteen pulses will be read back in succession to the counting circuit to count again through the fifteen counts. It will be noted that the last pulse applied through the gate 96 will advance the counter to 15 to apply a negative enabling signal through lead 99 to an inverter circuit 100. The inverter circuit includes a capacitor 101 which is charged by the negative signal over a sufficient time interval to activate the inverter circuit for inversion of the signal whereby to apply a positive signal to the relay driver stage 102. The latter is connected to the latching relay 76 and upon receiving a positive signal will deenergize the relay to open contacts 70 and 71 and turn off the error-indicator light. An important factor here is that exactly fifteen pulses must be applied through the error-checking circuit so that the counting circuit will remain at count 15 long enough to charge the capacitor 101 for application of the necessary signal level to deenergize the latching relay through the relay driver stage. Otherwise, should the playback head read back more or less than fifteen pairs of frequency bursts the counting circuit will either not reach 15, or exceed 15 and be set to 0 so that the capacitor 101 will not build up a sufficient charge to deenrgize the latching relay; and the error-indicating light L will remain on to indicate an error, since of course the tape drive motor as controlled by the separate delay circuit 81 will have turned off. Thus, an instantaneous indication of any error due to faulty recordings or malfunctioning is afforded visually to the operator.

From the foregoing, it will be evident that the recording system of the present invention is highly versatile, requiring a minimum number of circuit components to carry out translation, recording and error-checking of the frequency combinations. For example, a single pulse is utilized for counting and timing the recording of frequency bursts on tape; the counting circuit is employed both for translation of the information and for error-checking, and a minimum number of frequency pulse generators are utilized in different combinations for recording.

In use, the present invention would have a number of practical applications, for example, as a means of inventory control to periodically record the inventory movement of large numbers of different items. For example, the manual switches S may be suitably coded with letters or numbers to indicate each different type of item, bin number, quantity of items and other related information. By employing a portable hand unit, the necessary information for each item may be coded into the unit simply by advancing the dials for the manual switches to the appropriate setting, which as previously described will advance the wiper arms 22 to corresponding settings of the switch contacts. When the desired information is coded into the unit through the dials of the manual switch, the record button R is depressed to clear the counting circuit 27 and flip-flop stage 78; then upon release will initiate the recording cycle as described to translate the information from the switch contacts through the write circuit sequentially onto the recording tape surface. Automatically, upon completion of the recording cycle and recording of frequency bursts on the tape to correspond with the information on the switch contacts, the error-checking phase is initiated as described to count the number of frequency bursts on the recording surface and to indicate to the unit whether the correct number of bursts have been recorded in parallel on the recording channels. If not, of course the error-indicating light L remains lighted to indicate an error in recording which may be due either to some malfunctioning in the circuit, low power or faulty tape. The record button R may immediately be depressed and released again to rerecord the information from the manual switches, and other suitable checks may be made to determine the possible error in the recording cycle. In this connection, however, the error is immediately detected and this can similarly be indicated when the information is read out from the tape to the data processing center. For example, the tape may be read out and translated into a four bit code plus parity and applied to a buffer which will convert the code back to a binary code or to language the computer will recognize as the numbers between 0 and 9, to correspond with the number settings or other suitable codes employed on the manual switches.

Although the present invention is described as embodied in a form in which it is now contemplated applying its principles, such is to be taken as being merely illustrative; furthermore, various changes and modifications may be restored to with respect to the particular components and subcombinations employed by persons skilled in the art without departing from the scope thereof as defined by the appended claims.

What is claimed is:

1. A recording system comprising a recording surface, recording means disposed for recording units of information on the recording surface, a plurality of frequency pulse generating means for generating pulses of different discrete frequencies, means applying selected combinations of the frequencies generated for simultaneous recording by said recording means on the recording surface according to a combinatorial code in which each different combination of frequencies recorded is representative of a different unit of information and timing signal generating means to produce timing signals for controlling the duration of recording and spacing between frequency pulses recorded on the recording surface.

2. A recording system according to claim 1 wherein said recording surface includes at least two parallel recording channels and each of said recording means includes a recording head being aligned over each recording channel for simultaneous recording of each of the frequencies in the combination selected.

3. A recording system according to claim 1 being further characterized by playback heads disposed in spaced trailing relation to each of said recording heads to sense the frequencies in each combination recorded.

4. In a recording system having a movable recording surface and a plurality of recording means disposed for recording information on the surface, the combination therewith of a plurality of frequency pulse generating means for simultaneously generating pulses of different discrete frequencies, means interconnecting each of said frequency pulse generating means and at least one of said recording means with at least one of said frequency pulse generating means being interconnected to at least two of said recording means, and translating means for selecting at least one of the frequencies generated for simultaneous recording through each of said recording means on the recording surface according to a combination code in which each different frequency combination selected is representative of a different characteristic unit of information to be recorded and timing pulse generating means to produce timing pulses for controlling the duration of recording and spacing between frequency pulses recorded on the recording surface.

5. A data recording system comprising a movable data recording medium having parallel recording channels for storing digital information thereon, recording means including a plurality of recording heads arranged to simultaneously record digital information in juxtaposed relation on said channels, a plurality of frequency pulse generating means for simultaneously generating pulses of different selected frequencies, each different combination of frequencies being representative of a different digit value unit of information, means translating each digit to be recorded into a predetermined frequency combination representative of the information unit, means selectively applying each frequency of the predetermined frequency combinations for simultaneous recording of each frequency of that combination through a recording head on each channel and timing pulse generating means to produce timing pulses for controlling the duration of recording and spacing between frequency pulses recorded on the recording surface, and means for sensing the number of frequency combinations recorded on each channel including error-checking means for comparing the frequency combinations recorded with the number of information units translated for recording.

6. A data recording system comprising a data storage medium having a plurality of parallel recording tracks each for storing energy pulses thereon, recording means including recording heads located adjacent each track for simultaneously recording energy pulses in parallel on said tracks, each different combination of energy pulses recorded being representative of a different unit of information to be recorded, means for applying selected combinations of energy pulses in succession for recording on said tracks including timing pulse generating means to produce timing pulses for controlling the duration of recording and spacing between each of the energy pulses recorded on each track, read heads in spaced trailing relation to said recording heads for sensing the energy pulse combinations recorded, and error-indicating means for signalling a difference in number between energy pulse combinations recorded and the units of information to be recorded.

7. A data recording system according to claim 6 wherein a counter is provided for successively applying information signals indicative of each unit of information, and said timing pulse generating means being operable to synchronize the application of information signals from said counter with the timing pulses.

8. A data recording system comprising in combination a magnetic recording surface, a plurality of recording heads disposed for simultaneously recording frequency bursts on parallel recording channels of the recording surface, drive means for advancing the recording surface at a predetermined rate of speed, a plurality of input members each movable to a code setting representative of a unit of information to be recorded, a counter for scanning each input member in succession to apply an information signal indicative of the code setting, a series of frequency pulse generators each for generating a pulse of a different characteristic frequency, means interconnecting each frequency pulse generator and at least one of said recording heads including a frequency control gate between each frequency pulse generator and the recording head to which it is connected, clock pulse generating means for producing a succession of pulses to successively advance said counter through each input member at a rate depneding upon the spacing between control pulses applied thereto, means interconnecting corresponding code settings to a common frequency control gate for each recording head with each different code setting being connected to a different combination of frequency control gates according to a combinatorial code, means disabling said clock pulse generating means upon completion of each counting cycle, playback heads disposed in spaced trailing relation to said recording heads for sensing the number of frequency bursts recorded in succession on each channel of the recording surface, to advance said counter a corresponding number of counts, and error-indicating means responsive to advancement of said counter to signal a difference between the number of frequency burst combinations recorded on the recording surface and the number of input members.

9. A data recording system comprising in combination a magnetic recording surface, a pair of recording heads disposed in parallel for simultaneously recording frequency bursts on spaced recording channels of the recording surface, drive means for advancing the recording surface at a predetermined rate of speed, a plurality of multiposition switches each movable to number settings representing the digit values 0 to 9, a binary counter for scanning each switch in succession to apply an information signal through the selected number setting of each switch, a series of frequency pulse generators each for generating a pulse of a different characteristic frequency, means interconnecting each frequency pulse generator and at least one of said recording heads including a frequency control gate between each frequency pulse generator and the recording head to which it is connected, clock pulse generating means for producing a succession of pulses to advance said counter through each selected number setting in succession at a rate depending upon the spacing between clock pulses applied thereto, correspondingly numbered settings being connected to a common frequency control gate for each recording head and each different number setting being connected to a different pair of frequency control gates to provide ten different frequency combinations for recording with each representative of a digit value from 0 to 9, each frequency control gate being responsive to the simultaneous arrival of an information signal and a pulse from said clock pulse generating means to apply frequency bursts to a connected recording head for recording on the recording surface, means disabling said clock pulse generating means upon completion of each counting cycle, playback heads disposed in spaced trailing relation to said recording heads for sensing the number of frequency bursts recorded on each channel of the recording surface to produce a counting pulse, means responsive to the simultaneous arrival of a counting pulse from each playback head to advance said counter one count, and error-indicating means responsive to advancement of said counter a predetermined number of counts to compare the number of frequency burst combinations recorded on each channel with the number of said switches.

References Cited

UNITED STATES PATENTS

| | | | |
|---|---|---|---|
| 2,275,609 | 3/1942 | Bryce | 346—74 |
| 2,701,279 | 1/1955 | Lovell et al. | 340—171 |
| 2,813,259 | 11/1957 | Burkhart | 340—174.1 |
| 3,088,101 | 4/1963 | Schrimpf | 340—174.1 |
| 3,263,222 | 7/1966 | Coleman et al. | 340—174.1 |

BERNARD KONICK, *Primary Examiner.*

A. I. NEUSTADT, *Assistant Examiner.*